E. A. BALSLEY.
BELT SHIFTING MECHANISM.
APPLICATION FILED SEPT. 11, 1913.
1,131,195.
Patented Mar. 9, 1915.
2 SHEETS—SHEET 1.
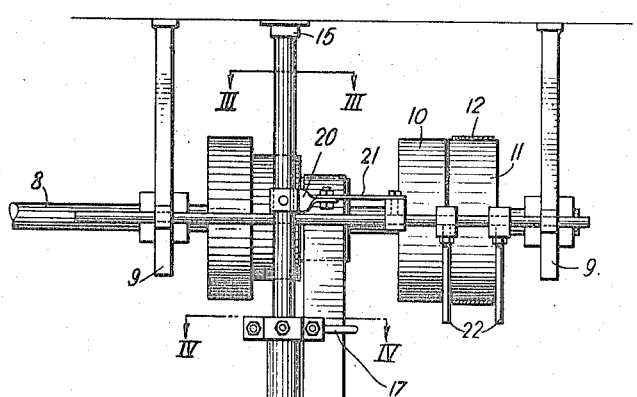
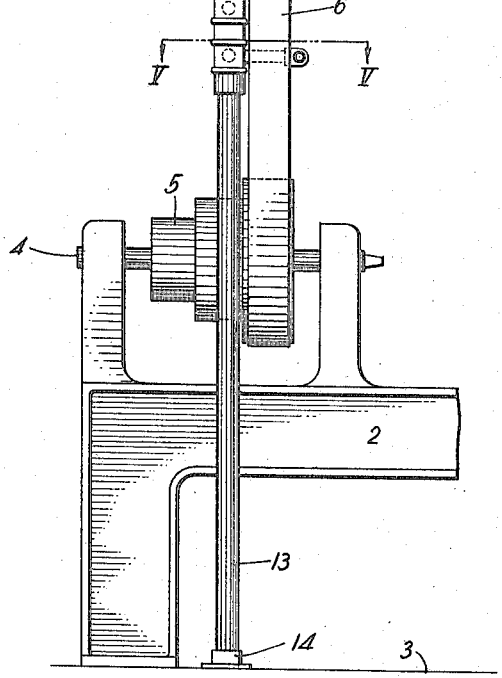
FIG. 1
FIG. 4
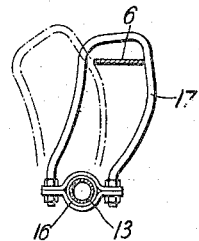
FIG. 6
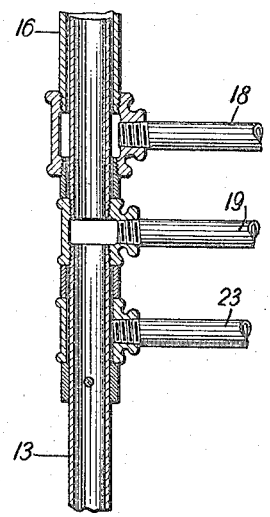
WITNESSES
Chas. Joxterman
R D Little
INVENTOR
Eugene A. Balsley
by Southerman, Belt & Fuller
his Attorneys

UNITED STATES PATENT OFFICE.

EUGENE A. BALSLEY, OF CHICAGO, ILLINOIS.

BELT-SHIFTING MECHANISM.

1,131,195. Specification of Letters Patent. Patented Mar. 9, 1915.

Application filed September 11, 1913. Serial No. 789,252.

*To all whom it may concern:*

Be it known that I, EUGENE A. BALSLEY, a citizen of the United States, residing at Chicago, in the county of Cook and State of Illinois, have invented a new and useful Belt-Shifting Mechanism, of which the following is a specification.

My invention relates to the class of devices used in shifting the endless belts used in driving machine tools or other power driven mechanisms, and more particularly relates to a novel construction and arrangement of belt shifters and operating mechanism therefor whereby each of a plurality of belt shifters is actuated from a conveniently located common position or place.

One object of my invention is to provide a belt shifting mechanism having improved means whereby an endless belt is readily shifted or moved from one to another of the series of steps of a cone pulley.

Another object of the invention is to provide a belt shifting mechanism having novel means whereby an endless driving belt is quickly shifted or caused to move from a fast to a loose pulley, and vice versa.

A further object of this invention is to provide a belt shifting mechanism having novel means whereby the levers or operating handles by which the belt shifters are actuated are located adjacent to each other in a convenient position relative to the floor of the shop or other place in which the belt shifting mechanism is erected.

Still further objects of the invention will become apparent as the invention is more fully described hereinafter.

Figure 3:
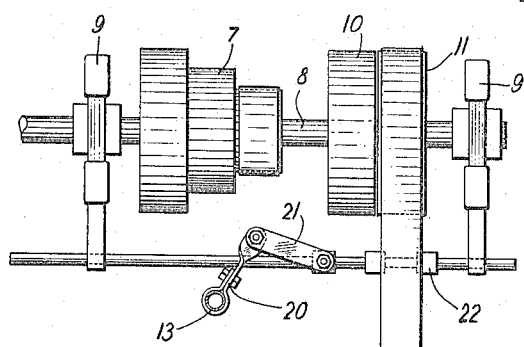
Figure 5:
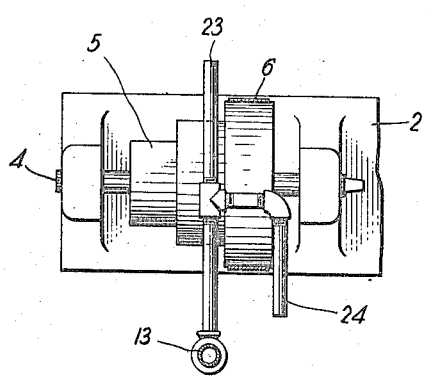
Figure 2:
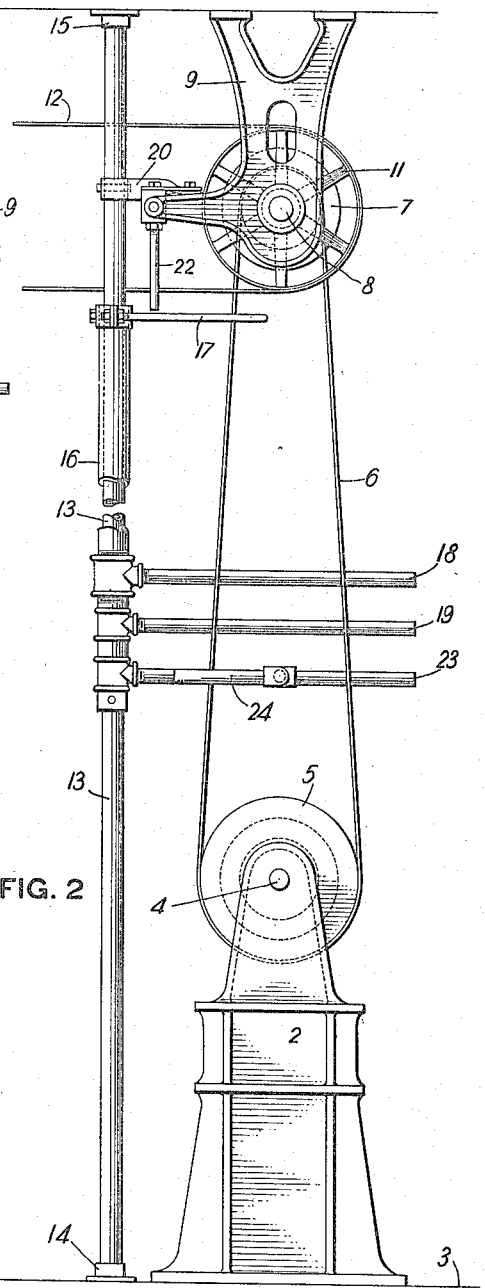

Referring to the drawings forming part of this specification, Figure 1 is an elevation showing a belt shifting mechanism constructed and arranged in accordance with my invention. Fig. 2 is an elevation of the same at right angles to the elevation of Fig. 1. Fig. 3 is a partial plan showing the construction and arrangement of the belt shifter for the countershaft driving belt of the overhead countershaft illustrated in Figs. 1 and 2. Fig. 4 is a sectional plan showing a detail of the loop forming part of the belt shifter for the cone pulley on the overhead countershaft of Figs. 1, 2 and 3. Fig. 5 is a sectional plan showing a detail of the construction of the belt shifter for the lower cone pulley on the lathe or other belt driven mechanism. Fig. 6 is a sectional elevation showing in detail the construction of the operating mechanism by which the series of belt shifters are actuated from a position common to all of said shifters.

In the accompanying drawings the numeral 2 designates a lathe or other machine tool which is erected in place on a suitable foundation 3 at the floor level of a shop. The tool 2 has a spindle or shaft 4 on which is a driven cone pulley 5, and connected to the cone pulley 5 by an endless belt 6 is an overhead cone pulley 7 secured on the countershaft 8 which is mounted in suitable hangers 9, 9, which are conveniently secured to the ceiling of the building in which the machine tool is located. Also mounted on the countershaft 8 is a fast pulley 10 and a loose pulley 11, and operatively connecting these pulleys 10 and 11 with a motor, a jack shaft or other prime mover (not shown,) is an endless belt 12.

Erected so as to extend vertically in a convenient location adjacent to the lathe or other machine tool 2 is a vertical post or shaft 13 which is mounted so as to be rotatable in suitable top and bottom bearings 14 and 15. Telescoping over the shaft 13 so as to rotate thereon is a second shaft 16, as is clearly shown in Figs. 1, 2 and 6, and fastened to the upper end of the shaft 16, which is hollow, is a stirrup or yoke 17 arranged to embrace and engage with the side edges of the driving belt 6 for the countershaft 8 at a point close to the cone pulley 7 mounted on the countershaft 8. A horizontally extending handle 18 is provided at the lower end of the shaft 16 by which the shaft 16 is rocked or swung to move the yoke 17 in throwing or shifting the belt 6 from one to another of the steps of the cone pulley 7 in changing the speed at which the spindle 4 of the tool 2 is operated. Positioned below the lever or handle 18 for the hollow shaft 17 is a second lever or handle 19 which is fastened to the hollow shaft 13 to rock this shaft, and secured adjacent to the upper end of the shaft 13 is a lever arm 20 which is connected by a link 21 to the belt shifter 22 by which the countershaft driving belt 12 is shifted from the loose pulley 11 to the fast pulley 10 and from the pulley 10 to the pulley 11. Pivotally mounted on the shaft 13 adjacent to the levers or handles 18 and 19 is a third lever or handle 23 which is provided with a bent portion 24 forming a yoke or fork which embraces the belt 6 adjacent to the cone pulley 5 on the spindle 4 of the tool 2, the so-formed belt shifter being employed in throwing or shifting the belt 6 from one to another of the steps of the cone pulley 5 in changing the speed at which the shaft or spindle 4 is driven.

By reference to Figs. 1 and 2 it will be seen that the three operating levers or handles 18, 19 and 23 are all located adjacent to each other and are positioned at a suitable height above the level of the floor 3 to be readily grasped and actuated manually. It will also be noted that the vertical shafts to which the handles are connected are located in a convenient position relative to the machine tool 2 so as to be easily manipulated by the operator therefor.

In the operation of my improved apparatus the parts preferably are assembled as shown. When it is desired to start the tool with the belt 6 on the small step of the cone pulley 7 and the large step of pulley 5, the handle 19 is pulled or swung by the operator so as to shift the belt shifter 22 from the position shown in Figs. 1 and 3. Upon holding the shifter in moved position for a short time the belt 12 is caused to move over upon the fast pulley 10 from the loose pulley 11. When it is desired to change the speed of the spindle 4 of the tool 2 the operator swings the handle 23 to move the yoke 24 and this movement causes the belt 6 to shift from the large step to the intermediate step of the pulley, or to the small step of the cone pulley 5, as is desired and is determined by the distance the yoke 24 is swung by the operator. The handle 18 is then swung to move the yoke 17 which will engage with the side edge of the belt 6 and cause the belt to climb from the small step of the cone pulley 7 to the intermediate step or, when the yoke 17 is swung far enough, climb to the large step of the pulley 7. In moving the belt 12 from the fast pulley 10 to the loose pulley 11 and in shifting the belt 6 from a position in which it engages with the small step of the pulley 5 and the large step of the pulley 7 to one of the other two positions on the cone pulleys, the operations just before described are reversed, the belt 6 being thrown from the large step to the desired smaller step on one cone pulley preparatory to throwing the belt from a small to a larger step on the other of the coacting cone pulleys.

The advantages of my invention will be apparent to those skilled in the art.

The apparatus is simple and is easily kept in repair. By its use the operations of changing the belts in a lathe driving mechanism are facilitated and are performed mechanically, so that liability of injury to the operators in throwing belts by hand, as usually done in shifting the belts, is avoided and overcome.

Modifications in the construction and arrangement of the parts may be made without departing from my invention as defined in the claims.

I claim:

1. In a belt shifting mechanism the combination with a belt driving mechanism comprising a driven cone pulley, a countershaft, a driving cone pulley thereon, a belt connecting said cone pulleys, fast and loose pulleys on the countershaft, and a driving belt for the fast and loose pulleys, of a belt shifter for throwing the belt on the driving cone pulley, a shifter for throwing the belt on the driven cone pulley, a shifter for throwing the belt on the fast and loose pulleys, independently movable shifter operating hand levers connected one to each of the belt shifters, and a vertical support on which said hand levers are pivotally mounted, said vertical support forming the means operatively connecting one hand lever and shifter.

2. In a belt shifting mechanism the combination with a belt driving mechanism comprising a driven cone pulley, a countershaft, a driving cone pulley, a belt connecting said cone pulleys, fast and loose pulleys on the countershaft, and a driving belt for the fast and loose pulleys, of a belt shifter for throwing the belt on the driving cone pulley, a shifter for throwing the belt on the driven cone pulley, a shifter for throwing the belt on the fast and loose pulleys, a vertical post operatively connected to the shifter for the belt on the fast and loose pulleys, a rotary post telescoping over the first post and operatively connected to the shifter for moving the belt on the driving cone pulley, horizontally extending levers for independently rotating said posts to actuate said shifters, and a lever pivoted on the vertical post having a shifter connected to and throwing the belt on the driven cone pulley.

3. A belt shifter comprising a driven pulley and a driving pulley, belts thereon, a shifter for each belt, a rotating post for each shifter and a manually operated handle on each post, one post being telescoped on the other, and each post being independently movable.

In testimony whereof, I have hereunto set my hand.

EUGENE A. BALSLEY.

Witnesses:
H. H. ZIESING,
E. C. MALTBY.